May 24, 1932.   H. BANY   1,860,166
AUTOMATIC CONTROL EQUIPMENT
Filed May 4, 1931
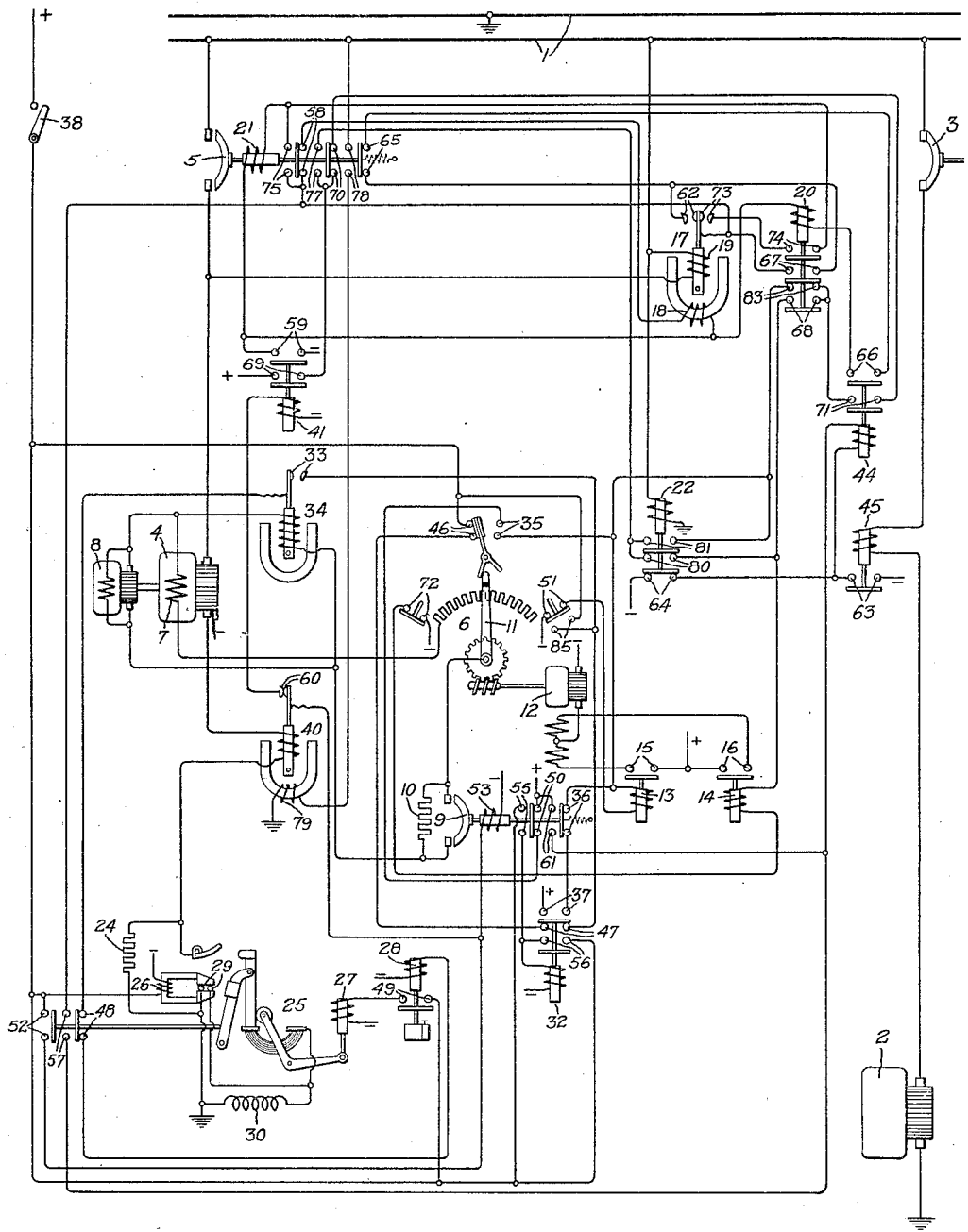
Inventor:
Herman Bany,
by *Charles A. Mullen*
His Attorney.

Patented May 24, 1932

1,860,166

UNITED STATES PATENT OFFICE

HERMAN BANY, OF YEADON, PENNSYLVANIA, ASSIGNOR TO GENERAL ELECTRIC COMPANY, A CORPORATION OF NEW YORK

AUTOMATIC CONTROL EQUIPMENT

Application filed May 4, 1931. Serial No. 534,910.

My invention relates to automatic control equipments and particularly to equipments for controlling the connection between a source of current and an electric circuit and its object is to provide an improved arrangement for controlling the voltage of a source of current and the connection thereof to an electric circuit after the source has been disconnected from the circuit in response to different abnormal current conditions of the source. A more specific object is to provide an arrangement whereby a source, after it has been disconnected from a load circuit in response to a predetermined abnormal current output, can be connected only after the source voltage has been reduced to a predetermined value, whereas when the source has been disconnected by a reversal of current, it can be reconnected without the source voltage first being reduced to said predetermined value.

Another object of my invention is to provide an improvement in the automatic control arrangement covered by my copending application Serial No. 413,653, filed December 12, 1929, which has materialized into a patent whose number is 1,801,242, and assigned to the assignee of this application.

My invention will be better understood from the following description when considered with the accompanying drawing, which shows the invention in diagrammatic form and its scope will be pointed out in the appended claims.

Referring to the accompanying drawing, 1 represents an energized load circuit which is arranged to be supplied with current from a plurality of sources, two of which are shown in the drawing as direct current generators 2 and 4. In order to simplify the disclosure, the generator 2 is arranged to be connected to the load circuit 1 by means of a manually controlled circuit breaker 3 and only the generator 4 is shown as having associated therewith an automatic switching arrangement, embodying my invention, for controlling the connection of the generator to the load circuit 1. It is to be understood, however, that the connection of the generator 2 to the load circuit 1 may be controlled, if desired, by automatic switching means similar to that shown associated with the generator 4.

After the generator 4 has been started, in any suitable manner, examples of which are well known in the art, it is sometimes desirable not to connect the generator to the load circuit 1 until a predetermined voltage condition of the generator exists. Such an arrangement is shown in the drawing in which the generator 4 is provided with suitable regulating means for automatically regulating the generator voltage so that it has to be higher than the load circuit voltage before the circuit breaker 5, between the generator 4 and the load circuit 1 can be closed. This result is accomplished by providing an adjustable rheostat 6 in the circuit of the generator field winding 7, which is arranged to be connected across the terminals of a direct connected exciter 8 by means of a suitable field switch 9. In order that the switch 9, when it opens, may not have to interrupt the field current completely, a suitable resistor 10 is connected in shunt across the terminals of the switch 9. The movable arm 11 of the adjustable resistor 6 is adjusted by means of a suitable reversible motor 12, the circuit of which is controlled by two control relays 13 and 14. When the relay 13 is energized its contacts 15 complete a circuit for motor 12 so that the rheostat arm 11 is moved in a direction to lower the generator voltage. When the control relay 14 is energized its contacts 16 complete a circuit for motor 12 so that the rheostat arm 11 is moved in the opposite direction to increase the generator voltage.

After the generator field switch 9 is closed, and before the circuit breaker 5 is closed, the operation of the motor operated rheostat 6 and the closing of the circuit breaker 5 are controlled by means of a voltage differential relay 17 which is responsive to the relative voltages of the generator 4 and the load circuit 1 so that when the load circuit 1 is energized, the circuit breaker 5 can be closed, only after the generator voltage has been increased from a value below the load circuit voltage to a value above the load circuit voltage. As shown in the drawing, the voltage directional relay 17 is of the directional type and includes a polarizing winding 18, which may be energized from any suitable source of direct current having a predetermined polarity, and an operating winding 19 which is connected in shunt to the main terminals of the circuit breaker 5 so that it is energized in response to the difference between the voltages of the generator 4 and the load circuit 1 when the circuit breaker 5 is open. When the generator voltage is below the load circuit voltage, the voltage differential relay 17 is arranged to complete an energizing circuit for a control relay 20 which, when energized, completes a locking circuit for itself. The relay 20 also completes a circuit for the control relay 14 so that the motor operated rheostat 6 is operated to increase the generator voltage. When the generator voltage is above the load circuit voltage and the control relay 20 is energized, the voltage differential relay 17 is arranged to complete an energizing circuit for the closing coil 21 of the circuit breaker 5. If however the generator voltage is above the load circuit voltage and the control relay 20 is not energized, the voltage directional relay 17 is arranged to complete a circuit for the control relay 13 so that the motor operated rheostat 6 is operated in a direction to decrease the generator voltage to a value below the load circuit voltage. When the generator voltage becomes less than the load circuit voltage the voltage directional relay 17 then operates in the manner above described to effect the operation of the control relay 20 and the subsequent closing of the circuit breaker 5 when the generator voltage subsequently exceeds the load circuit voltage. This feature of closing a circuit breaker between a source of current and a load circuit only after the voltage of the source has been increased from a value below the load circuit voltage to a value above the load circuit voltage is disclosed and claimed in Letters Patent 1,695,004.

After the circuit breaker 5 closes, the motor operated rheostat 6 may be placed under the control of any suitable control means, examples of which are well known in the art, so as to regulate the voltage of the generator 4 in a manner to maintain constant a desired electric condition of the load circuit 1. As shown in the drawing, the closing of the circuit breaker 5 places the rheostat 6 under the control of a voltage relay 22 which is responsive to the voltage of the load circuit 1 so that the rheostat 6 is automatically adjusted to maintain the load circuit voltage constant at a predetermined value.

In order to protect the generator 4 against excessive overloads and short-circuits on the load circuit 1 and also to limit the amount of current the circuit breaker 5 has to interrupt under such abnormal current conditions, a suitable current limiting device, such as a resistor 24, is arranged to be connected in series with the generator 4 and the load circuit 1 upon the occurrence of such abnormal current conditions. As shown, the resistor 24 is normally short-circuited by a circuit breaker 25 of the well known quick acting type which comprises a holding coil 26, a closing coil 27, an auxiliary control relay 28 for the closing coil 27, a flux diverting winding 29 which is connected in series with the generator 4 and the load circuit 1 and a reactor 30 which is connected in shunt with the flux diverting winding 29. As is well known in the art, this reactor 30 causes the circuit breaker 25 to open in response to a lower value of current under short-circuit conditions than is required to open the circuit breaker under normal overload conditions.

The control for circuit breakers 5 and 25 is arranged so that whenever that circuit breaker 25 is opened, the circuit breaker 5 and the field switch 9 are also opened and cannot be reclosed until after the circuit breaker 25 has been reclosed.

Whenever the circuit breakers 5 and 25 are opened in response to an overload or a short-circuit it is desirable to reduce the generator voltage to its minimum value before the circuit breaker 25 is reclosed. Therefore, in the arrangement shown, a relay 32 is so connected that whenever the circuit breaker 25 opens while the generator 4 is in an operative condition to supply current, the circuit breaker 25 cannot be reclosed while the generator remains in operation until after the rheostat 6 has been moved to its minimum voltage position.

In order, however, that it may not be necessary to wait for the rheostat to move from its minimum voltage position to its normal no-load voltage position whenever the generator is placed in operation after it has been shut down, the rheostat 6 and the circuit breaker 25 are controlled in such a manner that when the generator is disconnected from the load circuit under normal operating conditions, the rheostat 6 merely moves to its normal no-load voltage position and during the subsequent starting operation of the generator the circuit breaker 25 is arranged to be closed while the rheostat is in that position. In the drawing, this result is accomplished by providing an arrangement for closing the circuit breaker 25 when the relay 32 is deenergized and the voltage of the direct-connected exciter 8 is above a predetermined value and has the proper polarity to effect the closing of the contacts 33 of a suitable polarized voltage relay 34 connected across the terminals of the exciter. The energization of the control relay 32 is controlled by the field switch 9 which in turn is controlled by the circuit breaker 25 so that the field switch 9 is not closed until after the switch 25 has been closed and the relay 32 is not energized until after the field switch 9 has been closed. The control relay 32, when energized, is arranged to complete a locking circuit for itself so that after it is energized it remains energized as long as the generator is in operation. Therefore it will be seen that whenever generator 4 is being placed in operation after it has been shut down, the circuit breaker 25 can be closed independently of the movement of the rheostat 6 to its minimum position since under these conditions the relay 32 is deenergized. However, after the generator 4 has been placed in operation so that the relay 32 is energized, and the circuit breaker 25 and the field switch 9 are subsequently opened in response to an overload, it is necessary for the rheostat 6 to be moved to its minimum voltage position before the circuit breaker 25 can be reclosed.

In order that the rheostat 6 may be in its normal no-load voltage position whenever the generator 4 is started the generator field switch 9, when in its open position, is arranged to complete an energizing circuit for the control relay 13 if the rheostat 6 is in a position to produce an abnormally high no-load voltage, in which case the auxiliary contacts 35 on the rheostat 6 are closed. In order to effect the movement of the rheostat 6 to its minimum voltage position when the circuit breaker 25 is opened in response to an abnormal load condition, a circuit for the control relay 13 is arranged to be completed through auxiliary contacts on the field switch 9, when open, and contacts on the control relay 32, when energized.

The feature of causing the rheostat 6 to move to its minimum voltage position when the generator 4 is disconnected from the load circuit in response to an abnormally large current output of the generator 4 and of causing the rheostat 6 to move only to its normal no-load voltage position when the generator 4 is shut down under normal load conditions is disclosed and claimed in my copending application, Serial No. 413,653, filed December 12, 1929, above referred to, and assigned to the same assignee as this application.

In order to effect the closing of the circuit breakers 5 and 25, and the field switch 9, and operation of the rheostat 6 after the generator 4 has been started, I have shown a manually controlled switch 38, which is closed whenever it is desired to connect the generator 4 to the load circuit and which is opened whenever it is desired to disconnect the generator 4 from the load circuit 1 under normal load conditions. While I have shown the switch 38 as being manually controlled, in order to simplify the disclosure, it is obvious to one skilled in the art that this control switch may be automatically controlled in any suitable manner, examples of which are well known in the art.

For effecting the disconnection of the generator 4 from the load circuit 1 when the current through the generator 4 reverses, I have provided a power directional relay 40 which responds to the direction of the current flowing between the generator 4 and the load circuit 1 and which, in turn, controls a control relay 41 so that it is deenergized whenever power flows from the load circuit 1 to the generator 4. The control relay 41 controls the circuit of the closing coil 21 of the circuit breaker 5 so that it is opened in response to the deenergization of the relay 41. The relay 41, however, does not control the opening of the circuit breaker 25. Therefore, a current reversal only effects the opening of the circuit breaker 5.

When the generator 4 is disconnected from the load circuit 1 in response to a current reversal, it is desirable not to reconnect the source to the load circuit as long as the load connected thereto is of such a small value that the voltage of the load circuit, while the source 4 is disconnected, is above normal or the output of the other source 2, if it is connected to the load circuit, is below a predetermined value. If however the load, after the source 4 is disconnected by a current reversal, is such that either the load circuit voltage is below normal or the current output of the other source 2 is above a predetermined value, the source 4 should be reconnected as soon as possible. Therefore, in accordance with my invention, I provide an arrangement whereby the reconnection of the source 4 to the load circuit, after the source has been disconnected in response to a current reversal, is effected in response to predetermined electrical conditions indicative of the load on the load circuit and in such a manner that it is not necessary for the rheostat 6 first to be moved to its minimum voltage position before the reconnection is effected, as is the case when the source is disconnected by an overcurrent.

In the embodiment of my invention shown in the drawing, I accomplish these results by providing a control relay 44 which when the field switch 9 is closed, is controlled by the voltage of the load circuit 1 and the current which the source 2 supplies to the load circuit so that it is energized if either the load circuit voltage is below normal or the current output of the source 2 exceeds a predetermined value, thus indicating that the load is such that another generator should be connected to the load circuit. As shown in the drawing, an energizing circuit for the control relay 44 is arranged to be completed by the voltage relay 22 if the load circuit voltage is below normal. A current relay 45 which is responsive to the current flowing through the generator 2 is also arranged to complete an energizing circuit for the control relay 44 when the current output of the generator 2 exceeds a predetermined value.

The operation of the arrangement shown in the drawing is as follows: Let it be assumed that the generator 2 is connected across the load circuit 1 by the circuit breaker 3 and that the current output of the generator 2 increases to such a value as to warrant the connection of the generator 4 to the load circuit 1. Under the conditions assumed the generator 4 is first started and then the control switch 38 is closed at the proper time during the starting operation of the generator 4. The closing of the control switch 38 completes an energizing circuit for the holding coil 26 of the circuit breaker 25. If the polarity of the exciter 8 is correct so that the contacts 33 of the polarized relay 34 are closed, the closing of the control switch 38 also completes an energizing circuit for the control relay 28. This circuit is from one side of a suitable source of control current through the switch 38, contacts 46 of the rheostat 6 which are closed when the rheostat is in its normal or a subnormal no-load voltage position, contacts 47 of the deenergized control relay 32, contacts 33 of the polarized relay 34, auxiliary contacts 48 on the open circuit breaker 25, winding of control relay 28 to the other side of the control circuit. Control relay 28, by closing its contacts 49, completes an energizing circuit for the closing coil 27 of the circuit breaker 25 so that the current limiting resistor 24 is short-circuited. The circuit breaker 25 by opening its auxiliary contacts 48 interrupts the above traced circuit for the control relay 28 so that this relay becomes deenergized and in turn deenergizes the closing coil 27. The circuit breaker 25 however remains closed since the holding coil 26 is energized.

The movement of the rheostat 6 to its normal no-load voltage position if it is in a position to produce an abnormally high no-load voltage prior to the starting of the generator 4 is effected by the completion of a circuit for the control relay 13. This circuit of the control relay 13 is from one side of the control circuit through the auxiliary contacts 50 on open field switch 9, contacts 35 of the rheostat 6, winding of the relay 13, contacts 51 of the rheostat 6, which are closed when the movable arm of the rheostat is in a position to produce a relatively high no-load voltage, to the other side of the control circuit.

As soon as the circuit breaker 25 closes to short-circuit the resistor 24, the closing of the auxiliary contacts 52 of the circuit breaker 25 completes, through the control switch 38, an energizing circuit for the closing coil 53 of the field switch 9 so that the field resistor 10 is short-circuited. The field resistor 10 when in circuit maintains the current through the generator field winding 7 at such a small value that the generator voltage does not build up to its normal value. By closing its auxiliary contacts 55, the field switch 9 completes through the control switch 38 an energizing circuit for the control relay 32 so that this relay opens the contacts 47 in the above traced circuit for the control relay 28. Therefore as long as the control relay 32 remains energized, the circuit breaker 25 cannot be reclosed with the rheostat 6 in its normal no-load voltage position. The relay 32 by closing its contacts 56 completes a locking circuit for its winding. The relay 32, therefore, remains energized independently of the operation of the field switch 9 as long as the control switch 38 remains closed.

The closing of the auxiliary contacts 61 on the field switch 9 completes an energizing circuit for the polarizing winding 18 of the voltage differential relay 17. This circuit is from one side of the control circuit through the auxiliary contacts 61 on the field switch 9, auxiliary contacts 57 on the closed circuit breaker 25, auxiliary contacts 58 on the open circuit breaker 5, polarizing winding 18 of the relay 17, contacts 59 of the control relay 41 to the other side of the control circuit. The contacts 59 of the control relay 41 are closed since the circuit of the winding of this relay 41 is completed across the control circuit through the auxiliary contacts 60 of the power directional relay 40, the auxiliary contacts 52 on the closed circuit breaker 25 and the control switch 38. The closing of the field switch 9, therefore, renders the voltage directional relay 17 operative to control the operation of the motor operated rheostat 6 and the closing of the circuit breaker 5.

If the voltage of the generator 4 is lower than the voltage of the load circuit 1 at the time the auxiliary contacts 61 on the generator field switch 9 are closed, the contacts 62 of the relay 17 are closed so that a circuit is completed for the control relay 20 if the relay 44 is energized. The relay 44 is energized under the conditions assumed since the output of the generator 2 is assumed to be sufficient to cause the current relay 45 to close its contacts 63. The circuit of the relay 44 also includes the auxiliary contacts 61 on the closed field switch 9. The energizing circuit of the control relay 20, which is completed when the control relay 44 is energized, is from one side of the control circuit through the auxiliary contacts 61 on the field switch 9, the auxiliary contacts 57 on the closed circuit breaker 25, contacts 62 of the voltage directional relay 17, auxiliary contacts 65 on the open circuit breaker 5, contacts 66 of the relay 44, winding of the relay 20, contacts 59 of the control relay 41 to the other side of the control circuit. By closing its auxiliary contacts 67, the relay 20 completes a shunt circuit around the contacts 62 of the voltage directional relay 17 so that the subsequent opening of the contacts 62 does not effect the deenergization of the control relay 20. By closing its contacts 68, the control relay 20 completes an energizing circuit for the control relay 14 to effect the movement of the motor operated rheostat 6 so as to increase the generator voltage. This circuit of the control relay 14 is from one side of the control circuit through contacts 69 of the control relay 41, auxiliary contacts 70 on the open circuit breaker 5, contacts 71 of the control relay 44, contacts 68 of the control relay 20, winding of control relay 14, limit switch 72 of the rheostat 6 to the other side of the control circuit. The energization of the control relay 14 completes a circuit for the motor 12 so that the rheostat 6 is moved in the proper direction to increase the excitation of the generator 4. As soon as the voltage of the generator 4 exceeds the load circuit voltage a predetermined amount, the voltage directional relay 17 opens its contacts 62 and closes its contacts 73. The closing of the contact 73 completes an energizing circuit for the closing coil 21 of the circuit breaker 5 so that the generator 4 is connected directly across the load circuit 1. This energizing circuit for the closing coil 21 is from one side of the control circuit through the auxiliary contacts 61 on the field switch 9, auxiliary contacts 57 on the closed circuit breaker 25, contacts 73 of the voltage directional relay 17, contacts 74 of the control relay 20, closing coil 21 of the circuit breaker 5, contacts 59 of the control relay 41 to the other side of the control circuit.

The circuit breaker 5, by closing its auxiliary contacts 75, completes a locking circuit for the closing coil 21 which is independent of the contact 73 of the voltage directional relay 17 and the contacts 74 of the relay 20 so that the circuit breaker 5 remains closed when the voltage directional relay 17 and the control relay 20 subsequently open their respective contacts 73 and 74 due to the closing of the circuit breaker 5. The circuit breaker 5 by opening its contacts 70 removes the control of the motor operated rheostat 6 from the voltage directional relay 17 and by closing its auxiliary contacts 77 places the motor operated rheostat 6 under the control of the voltage relay 22. The closing of the auxiliary contacts 78 on the circuit breaker 5 connects the winding of the polarized winding 79 of the power directional relay 40 across the load circuit 1.

If the load circuit voltage is below a predetermined value after the circuit breaker 5 closes, the contacts 80 of the voltage relay 22 are closed and a circuit is completed for the control relay 14 to effect an increase in the generator voltage. This circuit for the control relay 14 is from one side of the control circuit through contacts 69 of the control relay 41, auxiliary contacts 77 on the closed circuit breaker 5, contacts 80 of the voltage relay 22, winding of the control relay 14, the limit switch 72 on the rheostat 6 to the other side of the control circuit. If the load circuit voltage is above a predetermined value, the contacts 81 of voltage relay 22 are closed and a circuit is completed for the control relay 13 to effect a decrease in the generator voltage. The circuit for the control relay 13 is from one side of the control circuit through contacts 69 of the control relay 41, auxiliary contacts 77 on the circuit breaker 5, contacts 81 of the voltage relay 22, winding of the control relay 13, limit switch 51 on the rheostat 6 to the other side of the control circuit.

If the voltage of the generator 4 is above the load circuit voltage at the time the voltage directional relay 17 is rendered operative, the relay 17 maintains its contacts 62 open so that the control relay 20 is deenergized. The control relay 20, when deenergized, completes an energizing circuit for the control relay 13 to effect a decrease in the generator voltage. This circuit for the control relay 13 is from one side of the control circuit through contacts 69 of the control relay 41, auxiliary contacts 70 on the open circuit breaker 5, contacts 71 of the control relay 44, contacts 83 of the control relay 20, winding of control relay 13, limit switch 51 on the rheostat 6 to the other side of the control circuit. The control relay 13 effects the operation of the rheostat 6 until the generator voltage is below the load circuit voltage when the voltage directional relay 17 closes its contacts 62 to effect the energization of the control relay 20. The relay 20 then effects, in the manner above described, the raising of the generator voltage until it exceeds the load circuit voltage at which time the relay 17 closes its contacts 73 so that the circuit breaker 5 is closed to connect the generator 4 to the load circuit 1.

Let it be assumed now that while the generator 4 is supplying current to the load circuit 1, a short-circuit occurs on the load circuit so that the circuit breaker 25 opens and removes the short-circuit from around the current limiting resistor 24. As soon as the circuit breaker 25 opens, the above traced circuit for the closing coil 53 of the generator field switch 9 is opened at the auxiliary contacts 52 on the circuit breaker 25 so that the generator excitation is reduced. By opening its auxiliary contacts 61, the generator field switch 9 interrupts the above traced holding circuit for the closing coil 21 of the circuit breaker 5 so that the generator 4 is entirely disconnected from the load circuit 1. The opening of the generator field switch 9 also completes an energizing circuit for the control relay 13 to effect the movement of the motor operated rheostat 6 to its minimum voltage position. This energizing circuit of the control relay 13 is from one side of the control circuit through the contacts 37 of the energized relay 32, auxiliary contacts 36 on the open field switch 9, winding of relay 13, limit switch 51 of the field rheostat 6 to the other side of the control circuit. This circuit of the control relay 13 remains closed until the movable arm 11 of the rheostat reaches its minimum voltage position in which position the arm 11 opens the limit switch 51 and closes the limit switch 85. The closing of the limit switch 85 completes an energizing circuit for the control relay 28 to effect the closing of the circuit breaker 25. This energizing circuit of the control relay 28 is from one side of the control circuit through the control switch 38, limit switch 85 of the rheostat 6, contacts 33 of the polarized relay 34, auxiliary contacts 48 of the open circuit breaker 25, winding of control relay 28 to the other side of the control circuit. The energization of the control relay 28 completes in the manner above described the energization of the closing coil 27 of the circuit breaker 25 so that the circuit breaker 25 closes and short-circuits the resistor 24. As soon as the circuit breaker 25 closes, the auxiliary contacts 57 thereof again complete the energization of the polarizing winding 18 of the voltage differential relay 17 so that this relay is again operative to control the operation of the rheostat 6 as soon as the generator field switch 9 is closed. By closing its auxiliary contacts 52, the circuit breaker 25 effects, in a manner above described, the closing of the generator field switch 9. By closing its auxiliary contacts 61, field switch 9 then renders the voltage directional relay 17 operative to control the generator voltage and the closing of the circuit 5 in the manner above described.

From the above description it will be observed that when the generator 4 is overloaded, it is completely disconnected from the supply circuit by the opening of both of the circuit breakers 5 and 25 and it cannot be reconnected thereto until after the voltage thereof has been reduced to a predetermined minimum value and then increased to a value above the load circuit voltage.

Let it be assumed now that while the generator 4 is connected to the load circuit 1, the current through the generator 4 reverses so that the reverse power relay 40 opens its contacts 60 and effects the deenergization of the control relay 41. The control relay 41 by opening its contacts 59 interrupts the above traced circuit for the closing coil 21 so that the circuit breaker 5 opens and disconnects the generator 4 from the load circuit 1. As soon as the circuit breaker 5 opens, the reverse current through the generator 4 ceases to flow so that the reverse power relay 40 recloses its contacts 60 and thereby effects the reenergization of the control relay 41. When the circuit breaker 5 opens in response to a reversal of power, however, the rheostat 6 is not operated until either the load circuit voltage has decreased to a value below normal so that the contacts 64 of the voltage relay 22 are closed or the load connected to the source 2 is sufficient to cause the current relay 45 to close its contacts 63.

If the generator 2 is supplying sufficient current to warrant the immediate reconnection of the generator 4 as soon as its voltage is increased to a value above the load circuit voltage, the circuit of the control relay 44 is completed through the contacts 63 of the relay 45. Therefore, as soon as the circuit breaker 5 is opened in response to a reversal of current through it, the rheostat 6 is placed under the control of the voltage directional relay 17 so that the reclosing of the circuit breaker 5 is effected in the manner above described after the voltage of the generator 4 has been increased from a value below the load circuit voltage to a value above the load circuit voltage.

If the generator 2 is not supplying sufficient current to cause the relay 45 to close its contacts 63 or if the generator 2 is not in operation, the reconnection of the generator 4 to the load circuit 1 after the circuit breaker 5 has been opened in response to a reversal of current through it, cannot take place until the load circuit voltage decreases to a subnormal value so that the contacts 64 of the voltage relay 22 are closed. As soon as the voltage relay 22 closes its contacts 64, the control relay 44 is reenergized and then the circuit breaker 5 is reclosed in response to the operation of the voltage directional relay 17 in the manner above described.

From the above it will be observed that when the generator is disconnected from the load circuit in response to a current reversal the generator voltage does not have to be reduced to its minimum value before the generator can be reconnected to the load circuit as is the case when the generator is disconnected from the load circuit in response to an overcurrent condition.

While I have in accordance with the patent statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:

1. In combination, an electric circuit, a source of current connected to said circuit, adjustable means for regulating the voltage of said source, means associated with said source for effecting the disconnection of said source from said circuit in response to a predetermined abnormal current condition and for effecting the reconnection of said source to said circuit in response to a predetermined voltage condition of said source only after said regulating means has been adjusted so as to reduce the voltage of the source to a predetermined minimum value, and means associated with said source for effecting the disconnection of said source from said circuit in response to another predetermined abnormal current condition and for effecting the reconnection of said source to said circuit in response to said predetermined voltage condition of said source independently of the adjustment of said regulating means so as to reduce the source voltage to said predetermined minimum value.

2. In combination, an electric circuit, a source of current connected to said circuit, adjustable means for regulating the voltage of said source, means associated with said source for effecting the disconnection of said source from said circuit in response to predetermined current outputs of said source and for effecting the reconnection of said source to said circuit in response to a predetermined relation between the voltages of said source and circuit only after said regulating means has been adjusted so as to reduce the voltage of the source to a predetermined minimum value, and means associated with said source for effecting the disconnection of said source from said circuit in response to a predetermined reverse current condition through said source and for effecting the reconnection of said source to said circuit in response to said predetermined relation between the voltages of said source and circuit independently of said adjustment of said regulating means to reduce the source voltage to said predetermined minimum value.

3. In combination, a source of current, an electric circuit, means responsive to a predetermined relation between the voltages of said source and circuit for effecting the connection of said source to said circuit, means for regulating the voltage of said source, means responsive to a predetermined abnormal current output of said source for effecting the disconnection of said source from said circuit and the operation of said regulating means to reduce the source voltage to a predetermined minimum value, means operative after said predetermined minimum source voltage has been established for effecting the operation of said regulating means so as to establish said predetermined relation between the voltages of said source and circuit whereby operation of said connecting means is effected, and means responsive to a predetermined reverse current through said source for effecting the disconnection thereof from said circuit and the subsequent operation of said regulating means to effect said predetermined relation between the voltages of said source and circuit independently of said operation of said regulating means to reduce the source voltage to said predetermined minimum value.

4. In combination, a source of current, an electric circuit, means responsive to a predetermined relation between the voltages of said source and circuit for effecting the connection of said source to said circuit, means for regulating the voltage of said source, means responsive to a predetermined abnormal current output of said source for effecting the disconnection of said source from said circuit and the operation of said regulating means to reduce the source voltage to a predetermined minimum value, means operative after said predetermined minimum source voltage has been established for effecting the operation of said regulating means so as to establish said predetermined relation between the voltages of said source and circuit whereby the operation of said connecting means is effected, means for effecting the disconnection of said source from said circuit in response to a predetermined reversal of current through said source, and means controlled by said last mentioned disconnecting means and an electric condition indicative of the load connected to said electric circuit for effecting the operation of said regulating means and connecting means whereby said source is reconnected to said circuit independently of the source voltage first being reduced to said predetermined minimum value.

5. In combination, a source of current, an electric circuit, means responsive to a predetermined relation between the voltages of said source and circuit for effecting the connection of said source to said circuit, means for regulating the voltage of said source, means responsive to a predetermined abnormal current output of said source for effecting the disconnection of said source from said circuit and the operation of said regulating means to reduce the source voltage to a predetermined minimum value, means operative after said predetermined minimum source voltage has been established for effecting the operation of said regulating means so as to establish said predetermined relation between the voltages of said source and circuit whereby the operation of said connecting means is effected, means for effecting the disconnection of said source from said circuit in response to a predetermined reversal of current through said source, and means controlled by said last mentioned disconnecting means and the load connected to said circuit for effecting, when the load is such as to require the reconnection of said source, the operation of said regulating means to establish said predetermined relation between the voltages of said source and circuit independently of the source voltage first being reduced to said predetermined minimum value.

6. In combination, a source of current, an electric circuit, two circuit breakers interconnecting said source and circuit, means responsive to a predetermined abnormal current condition of said source for effecting the opening of both of said circuit breakers, means responsive to another predetermined abnormal current condition of said source for effecting the opening of only one of said circuit breakers, and means controlled by said circuit breakers for effecting, when said first mentioned predetermined abnormal current condition effects the opening of both circuit breakers, the reclosing of said circuit breakers only after the voltage of said source first has been reduced to a predetermined minimum value and for effecting, when said second mentioned predetermined abnormal current condition effects the opening of only one circuit breaker, the reclosing of said one circuit breaker independently of the source voltage first being reduced to said predetermined minimum value.

7. In combination, a source of current, an electric circuit, two circuit breakers interconnecting said source and circuit, means responsive to a predetermined abnormal current output of said source for effecting the opening of both circuit breakers, means responsive to a reversal of current through said source for effecting the opening of only one of said circuit breakers, means for reclosing said one of said circuit breakers in response to a predetermined voltage condition of said source when only said one of said circuit breakers is open, means controlled by said circuit breakers for rendering said reclosing means inoperative to reclose said one of said circuit breakers after both breakers have been opened by said abnormal current output responsive means until the source voltage has been reduced to a predetermined value, and means controlled by an electric condition indicative of the load connected to said circuit for rendering said reclosing means operative after said reverse current responsive means has effected the opening of said one circuit breaker.

8. In combination, a source of current, an electric circuit, two circuit breakers interconnecting said source and circuit, means responsive to a predetermined abnormal current output of said source for effecting the opening of both circuit breakers, means responsive to a reversal of current through said source for effecting the opening of only one of said circuit breakers, means for reclosing said one of said circuit breakers in response to a predetermined voltage condition of said source when only said one of said circuit breakers is open, means for regulating the voltage of said source, and means controlled by said circuit breakers for controlling the operation of said regulating means and said reclosing means so that after both circuit breakers have been opened by said abnormal current responsive means, the regulating means is first operated to reduce the source voltage to a predetermined minimum value and then is adjusted to produce the necessary voltage condition to effect the operation of said reclosing means and so that after said one of said circuit breakers has been opened by said reverse current responsive means, the regulating means is adjusted only to produce the necessary voltage condition of said source to effect the operation of said reclosing means.

9. In combination, a source of current, an electric circuit, two circuit breakers interconnecting said source and circuit, means responsive to a predetermined abnormal current output of said source for effecting the opening of both circuit breakers, means responsive to a reversal of current through said source for effecting the opening of only one of said circuit breakers, means for reclosing said one of said circuit breakers in response to a predetermined voltage condition of said source when only said one of said circuit breakers is open, means for regulating the voltage of said source, means controlled by said circuit breakers for controlling the operation of said regulating means and said reclosing means so that after both circuit breakers have been opened by said abnormal current responsive means, the regulating means is first operated to reduce the source voltage to a predetermined minimum value and then is adjusted to produce the necessary voltage condition to effect the operation of said reclosing means and so that after only said one of said circuit breakers has been opened by said reverse current responsive means, the regulating means is adjusted only to produce the necessary voltage condition of said source to effect the operation of said reclosing means, and means controlled by a predetermined electrical condition of said electric circuit for rendering said regulating means inoperative after a current reversal until said predetermined electrical condition of said electric circuit occurs.

10. In combination, an electric circuit, a source of current connected thereto, means responsive to a predetermined abnormal current output of said source for effecting the disconnection of said source from said circuit, means responsive to a predetermined reversal of current through said source for effecting the disconnection of said source from said circuit, means operative when said predetermined abnormal current condition responsive means effects the disconnection of said source for effecting the reconnection of said source to said load circuit only after the source voltage first has been reduced to a predetermined minimum value, and means operative when said reverse current responsive means effects the disconnection of said source, for effecting the reconnection thereof independently of the source voltage first being reduced to said predetermined minimum value.

11. In combination, an electric circuit, a source of current connected thereto, means controlled by the voltage of said circuit for regulating the voltage of said source, means responsive to a reversal of current through said source for effecting the disconnection of said source from said circuit and for rendering said regulating means inoperative to regulate the voltage of said source, and means dependent upon a predetermined load condition of said circuit for again rendering said regulating means operative to regulate the voltage of said source.

12. In combination, an electric circuit, a source of current connected thereto, means controlled by the voltage of said circuit for regulating the voltage of said source, means responsive to a reversal of current through said source for effecting the disconnection of said source from said circuit and for rendering said regulating means inoperative to regulate the voltage of said source, means responsive to a predetermined relation between the voltages of said source and circuit for effecting the connection of said source to said circuit, and means dependent upon a predetermined load condition of said circuit occurring after said source is disconnected from said circuit for again rendering said regulating means operative to establish said predetermined relation between the voltages of said source and circuit.

In witness whereof I have hereunto set my hand.

HERMAN BANY.